US005468287A

United States Patent [19]

Hattori et al.

[11] Patent Number: 5,468,287

[45] Date of Patent: Nov. 21, 1995

[54] WATER COLOR

[75] Inventors: Mitsuo Hattori; Hitoshi Furuta; Taro Takahashi; Hirokazu Maeda, all of Ibaraki, Japan

[73] Assignee: Fuji Oil Co., Ltd., Osaka, Japan

[21] Appl. No.: 265,443

[22] Filed: Jun. 24, 1994

[51] Int. Cl.[6] .................... C09D 105/14

[52] U.S. Cl. .................... 106/217

[58] Field of Search .................... 106/217

[56] References Cited

U.S. PATENT DOCUMENTS 4,831,127 5/1989 Weibel .................... 106/163.1

*Primary Examiner*—David Brunsman

*Attorney, Agent, or Firm*—Wallenstein & Wagner, Ltd.

[57] ABSTRACT

A water color comprising a water-soluble hemicellulose, a pigment sparingly soluble in water and water.

2 Claims, No Drawings

WATER COLOR

BACKGROUND OF THE INVENTION

1. Field of the Invention

The present invention relates to a water color and more particularly to a water color which comprises a water-soluble hemicellulose as an effective component and has excellent coloring power and dispersion stability.

2. Description of the Related Art

Water colors have hitherto been produced by milling together a color pigment as a colorant, a colorless extender pigment, such as calcium carbonate or barium sulfate, a naturally occurring synthetic water-soluble polymer, such as gum arabic, dextrin or carboxymethyl cellulose, and water.

These water colors have a drawback that when they are filled into a tube or a container and allowed to stand for a long period of time, the water-soluble polymer is yellowed, which causes a change in hue of the water color to an unexpected one.

The use of naturally occurring gum substances, such as gum arabic, as the water-soluble polymer can provide water colors having the best properties in respect of coloring power and dispersibility of the pigment. However, the supply of the naturally occurring gum substances is susceptible to weather in production countries, so that the price fluctuation is large. For this reason, in recent years, naturally occurring gum substances, which can be stably supplied, have become strongly desired in the art.

As described above, when the water-soluble polymer as one component of the water color is used in final products, it should provide a good long-term dispersion stability. In this respect, the conventional water-soluble polymers do not always satisfy all the requirements.

SUMMARY OF THE INVENTION

The present invention aims at providing colors which exhibit stable coloring power and dispersion for a long period of time and can be supplied inexpensively and stably.

Under the above circumstances, the present inventors have made extensive and intensive studies and, as a result, have found that the use of a water-soluble hemicellulose, particularly a water-soluble hemicellulose derived from soybean, as the water-soluble polymer can provide water colors having good coloring power and dispersion stability. The present invention has been completed based on this finding.

Specifically, according to the present invention, there is provided a water color comprising a water-soluble hemicellulose, a pigment sparingly soluble in water, and water.

DESCRIPTION OF THE PREFERRED EMBODIMENTS

In the present invention, the water-soluble hemicellulose is preferably derived from beans, particularly soybeans, among others derived from seed leaves thereof.

Although the water-soluble hemicellulose may have any molecular weight, the average molecular weight is preferably in the range of from several tens of thousands to several millions, specifically in the range of from 50,000 to one million. The average molecular weight of the water-soluble hemicellulose is a value determined by the limiting viscosity method wherein the viscosity is measured in a 0.1M $NaNO_3$ solution using a standard prulan (manufactured by Showa Denko K.K.) as a standard substance. Uronic acid was measured by the Blumenkrantz method, and neutral sugars were measured by GLC (gas-liquid chromatography) after alditol acetylation.

The water-soluble hemicellulose can be produced by extracting the water-soluble hemicellulose from a raw material containing hemicelluloses with water or in some cases, by heat-eluting the hemicellulose therefrom under acidic or alkaline conditions or decomposition-eluting the hemicellulose therefrom with an enzyme. An embodiment of the above-described process for producing the water-soluble hemicellulose will now be described.

Husks of oily seeds, for example, soybeans, palm, coconut, corn and cottonseeds, obtained usually by removing fats and oils and proteins therefrom, or vegetable matter, such as residues of grains, for example, rice and wheat, obtained usually by removing starch therefrom. If soybeans are used as the raw material, bean curd residue produced as a by-product in the production of a bean curd, a soybean milk or a separated soybean protein may be utilized as the raw material.

The above-described raw material is heat-decomposed under acidic or alkaline conditions, preferably in a pH region around the isoelectric point of each protein, preferably at 80° to 130° C., still preferably 100° to 130° C., to fractionate a water-soluble fraction which is then dried as it is or alternatively subjected to, for example, an activated carbon treatment, a resin adsorption treatment or an ethanol precipitation treatment to remove hydrophobic substances or low molecular weight substances.

For example, gum arabic is used in water colors. However, the supply thereof is precarious. This has led to the development of chemically modified starch or the like. However, water colors containing chemically modified starch or the like has a poor coloring power and is not always satisfactory also in the dispersion stability of pigment.

The use of the water-soluble hemicellulose according to the present invention as the water-soluble polymer which is a raw material of the water colors can provide a more stable dispersion than the use of gum arabic and chemically modified starch.

In the present invention, the water-soluble hemicellulose, as such, can be used as the water-soluble polymer. However, the use thereof in combination with conventional water-soluble polymers can compensate for the drawbacks of the conventional water-soluble polymers.

Conventional synthetic water-soluble polymers include a water-soluble acrylic resin, a water-soluble styrene-acrylic resin and a water-soluble styrene-maleic acid resin. Further, emulsions of water-dispersible resins, such as acrylic resin, alkyd resin, vinyl resin, polyester resin, styrene resin, malic acid resin and urethane resin, may also be mentioned as examples of the conventional useful synthetic polymers.

Examples of conventional naturally occurring water-soluble polymers include gum arabic, tragacanth gum, carageenan, xanthan gum, gelatin, casein sodium, guar gum, gum tare, glue plants (funori), agar, furcellaran, tamarind seed polysaccharides, gum karaya, hibiscus, pectin, sodium alginate, prulan, jellan gum, locust bean gum, albumin such as whey and various starches. Examples of semi-synthetic water-soluble polymers include carboxymethyl cellulose (CMC), methyl cellulose (MC), hydroxyethyl cellulose (HEC), alginic acid propylene glycol ester and chemically modified starches including soluble starches.

In some cases, the effect of the water-soluble hemicellulose according to the present invention is further improved by using the water-soluble hemicellulose in combination with at least one member selected from the above-described various water-soluble polymers. In this case, the water-soluble hemicellulose can compensate for the drawbacks of the various water-soluble polymers.

In the present invention, any pigment may be used in the water color of the present invention so far as it is a solid substance which is sparingly soluble in water, and examples thereof include general color pigments. Water colors using black pigments can be utilized as a China ink (a black writing fluid). Thus, the present invention is applicable China inks and the whole range of water colors in solution, paste, solid, particulate and other forms.

Embodiments of the present invention will now described with reference to the following examples which are presented for illustrative purposes only and are not intended to limit the spirit and scope of the invention. In the following examples, all "parts" and "%" are by weight.

PREPARATION OF SOYBEAN HEMICELLULOSE

To raw bean curd residue ("okara") obtained in the process of manufacturing a separated soybean protein was added water in an amount of twice the amount of the raw bean curd residue. The mixture was adjusted to pH 4.5 with hydrochloric acid and hydrolyzed at 120° C. for 1.5 hr. The reaction mixture was cooled and centrifuged (10,000 G×30 min) to separate it into a supernatant and a precipitate. The collected precipitate was further washed with an equal weight of water and centrifuged, and the resultant supernatant was combined with the above supernatant, applied to an activated carbon column and dried to provide water-soluble hemicellulose (a).

Moreover, the water-soluble hemicellulose was dissolved in 0.5% saline, and reprecipitation was repeated three times in such a manner that the ethanol concentration became 50%, followed by desalting with an ion-exchange resin ("Amberlite IR-120 B" manufactured by Organo Corp.) to provide water-soluble hemicellulose (b).

Water-soluble hemicellulose (c) was provided as described above, except that the treatment using an activated carbon column was not effected.

The results are summarized in the following Table 1.

TABLE 1

| | Composition (%) | | |
|---|---|---|---|
| Ingredient | (a) | (b) | (c) |
| Water | 5.71 | 7.75 | 5.10 |
| Crude protein | 1.93 | 1.03 | 5.43 |
| Crude ash | 5.29 | 0.22 | 5.30 |
| Polysaccharides | 87.07 | 91.00 | 84.17 |
| Average molecular weight | 178,000 | 207,000 | 114,000 |

Then, the sugar composition of the water-soluble hemicelluloses (a), (b) and (c) was analyzed by the following method. Uronic acid was measured by the Blumenkrantz method, and neutral sugars were measured by the alditol acetate method using GLC.

The results were as given in the following Table 2.

TABLE 2

| | Sugar Composition (wt. %) | | |
|---|---|---|---|
| Type of sugar | (a) | (b) | (c) |
| Uronic acid | 20.4 | 16.9 | 19.4 |
| Rhamnose | 1.6 | 2.7 | 2.1 |
| Fucose | 2.7 | 5.2 | 3.9 |
| Arabinose | 19.9 | 19.2 | 23.1 |
| Xylose | 6.4 | 8.4 | 5.8 |
| Galactose | 47.3 | 46.8 | 43.4 |
| Glucose | 1.8 | 0.9 | 2.3 |

EXAMPLE 1

| | |
|---|---|
| Permanent Red 4R (Azo red pigment manufactured by Dainippon Ink and Chemicals, Inc.) | 20.0 parts |
| Water-soluble soybean hemicellulose (a) | 12.0 parts |
| Calcium carbonate | 30.2 parts |
| Glycerin | 10.0 parts |
| Phenol (preservative) | 0.2 part |
| Water | 27.6 parts |

The above-described ingredients were milled together three times by means of a three-roll mill to prepare a red water color.

EXAMPLE 2

A red water color was prepared in quite the same manner as that of Example 1, except that water-soluble soybean hemicellulose (b) was used instead of water-soluble soybean hemicellulose (a).

EXAMPLE 3

A red water color was prepared in quite the same manner as that of Example 1, except that water-soluble soybean hemicellulose (c) was used instead of water-soluble soybean hemicellulose (a).

| | |
|---|---|
| Permanent Red 4R (Azo red pigment manufactured by Dainippon Ink and Chemicals, Inc.) | 20.0 parts |
| Gum arabic | 20.0 parts |
| Calcium carbonate | 30.2 parts |
| Glycerin | 10.0 parts |
| Phenol (preservative) | 0.2 part |
| Water | 19.6 parts |

The above-described ingredients were milled together three times by means of a three-roll mill to prepare a red water color.

Comparative Example 2

A red water color was prepared in quite the same manner as that of Comparative Example 1, except that dextrin was used instead of gum arabic.

The water colors prepared in the Examples and Comparative Examples were each coated on drawing paper (drawing paper A specified in JIS P-3301) using a hair pencil, and a monitor test (the number of panelists: 20) on colored state and spreadability and evenness of the water colors. Further, the water colors prepared in the Examples and Comparative Examples were allowed to stand in a thermostatic chamber at 50° C. for one month and then coated on drawing paper using a hair pencil, and the coating was dried to observe a change in hue.

The results were compared with one another and are given in the following Table 3.

TABLE 3

| | Colored state | Spread-ability | Evenness | Change in hue |
|---|---|---|---|---|
| Ex. 1 | ⊚ | ⊚ | ⊚ | Yellowed to very small extent |
| Ex. 2 | ⊚ | ⊚ | ⊚ | Yellowed to very small extent |
| Ex. 3 | ⊚ | ⊚ | o | Yellowed to small extent |
| Comp. Ex. 1 | ⊚ | o | o | Yellowed to small extent |
| Ccmp. Ex. 2 | Δ | Δ | X | Yellowed to considerable extent |

⊚: Very good
o: Good
Δ: Somewhat poor
X: Poor

As is apparent from the above results, the use of water-soluble soybean hemicelluloses could provide water colors having good coloring power and color development and dispersion stability in respect of spreadability, evenness and the like.

EXAMPLE 4

| | |
|---|---|
| Water-soluble soybean hemicellulose (a) | 20.0 parts |
| Phenol | 0.4 part |
| Calcium carbonate | 20.0 parts |
| Hanza Yellow 10G | 12.0 parts |
| Water | 47.6 parts |

The above-described ingredients were milled together three times by means of a three-roll mill to prepare a yellow water color paste. The paste was poured into a vessel in a square dish form, frozen (at −15° to 20° C.) overnight and dehydrated by lyophilization to prepare a solid yellow water color which could be rapidly dissolved in water.

| | |
|---|---|
| Gum arabic | 27.0 parts |
| Phenol | 0.4 part |
| Calcium carbonate | 20.0 parts |
| Hanza Yellow 10G | 12.0 parts |
| Water | 40.6 parts |

A solid yellow water color was prepared on an experimental scale in the same manner as that of Example 4, except that the above ingredients were used. The solid yellow water color thus obtained could not be rapidly dissolved in water.

As is apparent from the foregoing description, when a water color is prepared using a water-soluble hemicellulose on an experimental basis, the dispersion of pigment remains stable for a long period of time also in the final product. Further, the use of the water-soluble hemicellulose in a solid water color provides a product having a very good redispersibility as opposed to the use of gum arabic capable of providing only a product which cannot be rapidly dissolved in water.

We claim:

1. A product prepared from the process of preparing a water color, comprising kneading together water, a pigment, and a water-soluble polymer, wherein the water-soluble polymer is water-soluble hemicellulose derived from soybean.

2. A product for preparing a water color, comprising water, a pigment, and a water-soluble polymer, wherein the water-soluble polymer is water-soluble hemicellulose derived from soybean.

* * * * *

UNITED STATES PATENT AND TRADEMARK OFFICE

CERTIFICATE OF CORRECTION

PATENT NO. : 5,468,287

DATED : November 21, 1995

INVENTOR(S) : Mitsuo Hattori et al.

It is certified that error appears in the above-indentified patent and that said Letters Patent is hereby corrected as shown below:

Column 4, line 45, insert chart heading --Comparative Example 1--.

Column 6, line 7, insert chart heading --Comparative Example 3--.

Signed and Sealed this

Twenty-sixth Day of March, 1996

*Attest:*

BRUCE LEHMAN

*Attesting Officer*

*Commissioner of Patents and Trademarks*